(12) United States Patent
De Souza

(10) Patent No.: US 11,846,452 B2
(45) Date of Patent: Dec. 19, 2023

(54) FOOD CONDITIONING DEVICE WITH TEMPERATURE CONTROL

(71) Applicant: Willian Garcia De Souza, Laurentino (BR)

(72) Inventor: Willian Garcia De Souza, Laurentino (BR)

(*) Notice: Subject to any disclaimer, the term of this patent is extended or adjusted under 35 U.S.C. 154(b) by 305 days.

(21) Appl. No.: 17/287,703

(22) PCT Filed: Oct. 18, 2019

(86) PCT No.: PCT/BR2019/050453
§ 371 (c)(1),
(2) Date: Apr. 22, 2021

(87) PCT Pub. No.: WO2020/082144
PCT Pub. Date: Apr. 30, 2020

(65) Prior Publication Data
US 2021/0381727 A1    Dec. 9, 2021

(30) Foreign Application Priority Data
Oct. 23, 2018 (BR) .......................... 102018071791-0

(51) Int. Cl.
*F25B 21/04* (2006.01)
*F25B 49/00* (2006.01)

(52) U.S. Cl.
CPC .............. *F25B 21/04* (2013.01); *F25B 49/00* (2013.01); *F25B 2700/2104* (2013.01)

(58) Field of Classification Search
CPC .. F25B 21/04; F25B 49/00; F25B 2700/2104; F25D 31/05
See application file for complete search history.

(56) References Cited

U.S. PATENT DOCUMENTS 5,423,194 A * 6/1995 Senecal .................. A47G 23/04
                                                          62/458
2006/0277924 A1* 12/2006 Platkin .................... F25B 21/04
                                                          62/3.3

FOREIGN PATENT DOCUMENTS

| BR | PI 9906288-7 A2 | 1/2017 |
| CN | 206025882 U | 3/2017 |
| WO | 9532656 A1 | 12/1995 |
| WO | 9716101 A1 | 5/1997 |
| WO | 9726490 A1 | 7/1997 |
| WO | 9927312 A1 | 6/1999 |

* cited by examiner

*Primary Examiner* — Elizabeth J Martin
(74) *Attorney, Agent, or Firm* — LaMorte & Associates, P.C.

(57) ABSTRACT

A compact device for the temperature conditioning of foods while allowing the food to be visible and using little physical space. The device features both heating and cooling functions, but is preferably used for cooling fruits, vegetables, accessory fruits, roots and others. The device is compact, having a translucent cover, thus offering better visibility and increasing food consumption. Preferably developed with polymeric material, the body has the function of protecting all the internal constituents of the device. The base of the device is responsible for thermal stability, keeping low or high temperature in the compartment for longer periods. The bowl of the device is responsible for holding food within the cooled or heated area and the food conditioning cover is made of a translucent material, with the function of keeping thermal stability.

3 Claims, 4 Drawing Sheets

FOOD CONDITIONING DEVICE WITH TEMPERATURE CONTROL

The food conditioning device with temperature control has a small-sized structure for conditioning of food, preferably fruits, allowing it to be always visible and using little physical space.

BACKGROUND OF THE INVENTION

Refrigerators have widened food options for the population and allowed a range of enhancements to our daily life, besides also influencing the evolution of food trade, economy and medicine.

The use of refrigeration in post-harvest preservation of fruits has become the main way to overcome the problems of regional production, allowing to offer said fruits to different regions and between crops.

STATE OF THE ART

Concerning the technique disclosed above, we can mention a few documents using the technology as mentioned, such as BR 9906288-7 (A2), disclosing a portable modular refrigerator with a refrigeration circuit with a thermoelectric tablet with Peltier effect, which may also present a retractable set of photoelectrical cells for operation with sunlight. Furthermore, document CN 206025882 (U) discloses a fruit bowl with a maintenance device, using a semiconductor refrigeration piece to produce a low temperature environment.

One of the problems currently faced by consumers concerning fruits concerns the temperatures used for their preservation. Many of them are faced to the environment—which may be hot, warm or cold—or stored in refrigerators. The adversity, in this second case, is the low preservation temperature, therefore starting chemical reactions and accelerating their degradation.

As another problem, fruits are stored in refrigerators and forgotten, since refrigerators remain closed, taking fruits out from the field of vision of persons.

The object developed by the present patent document is device which is refrigerated by means of the thermoelectric tablet technology, using the Peltier Effect. The device may present both the heating and the cooling function, but is preferably used for cooling fruits, vegetables, accessory fruits, roots and others. The heating function allows to heat bread, snacks and roasts in general.

The refrigerated device as disclosed herein has been especially designed with the use of two Peltier effect thermoelectric tablets, to preserve fruits at an optimum temperature range, between 12° C. and 18° C., keeping them fresh and reducing the degradation process, since, within that temperature range, chemical reactions in fruits are decelerated.

Furthermore, the object was developed to be compact and have a translucent cover, allowing the refrigerated device to be positioned so to be kept within the field of vision of persons, enabling better visibility and increasing consumption, for being in the field of vision each time anyone passes nearby, besides showing excellent appearance, considering the deceleration of fruit degradation.

DESCRIPTION OF THE DRAWINGS

The object of the present patent application may be better understood from the figures shown as illustrations, as well as their detailed description below.

DETAILED DESCRIPTION OF THE INVENTION

Figure 1A:
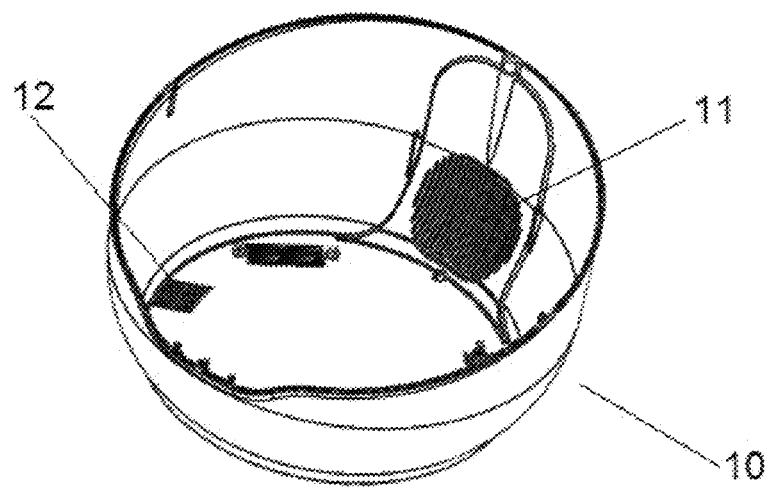
FIG. 1A shows the body of the device in an isometric view of the object and FIG. 1B shows an isometric view of the finishing collar (14).
Figure 1B:
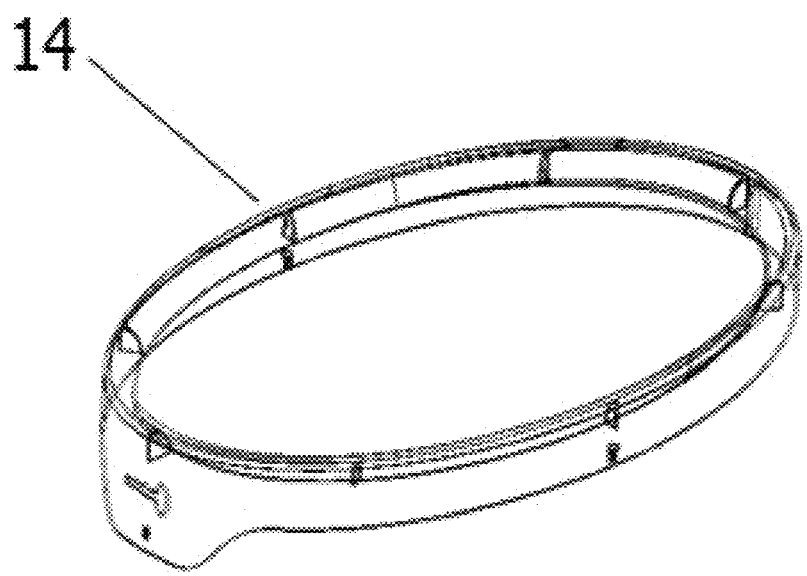
Figure 2A:
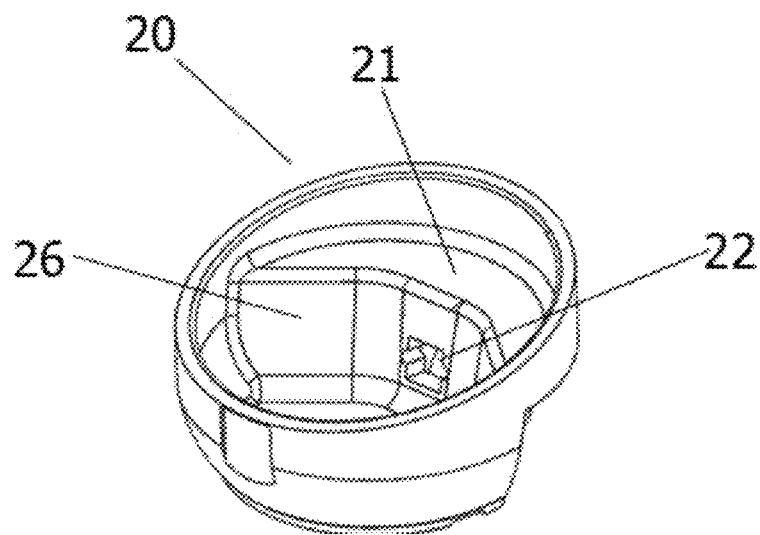
FIG. 2A shows an isometric view of the base (20) and FIG. 2B shows a detail view of said base (20).
Figure 2B:
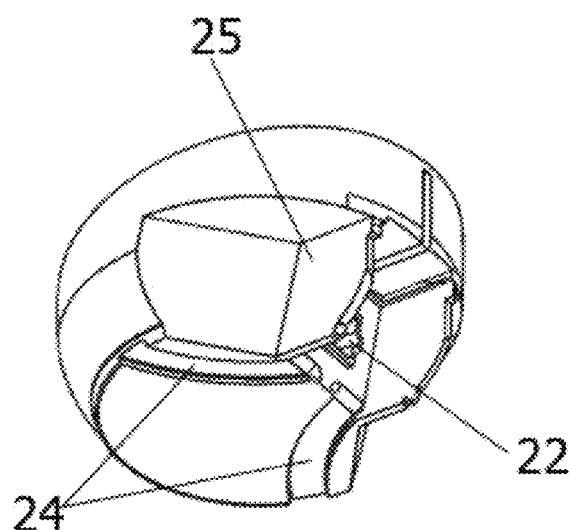
Figure 3A:
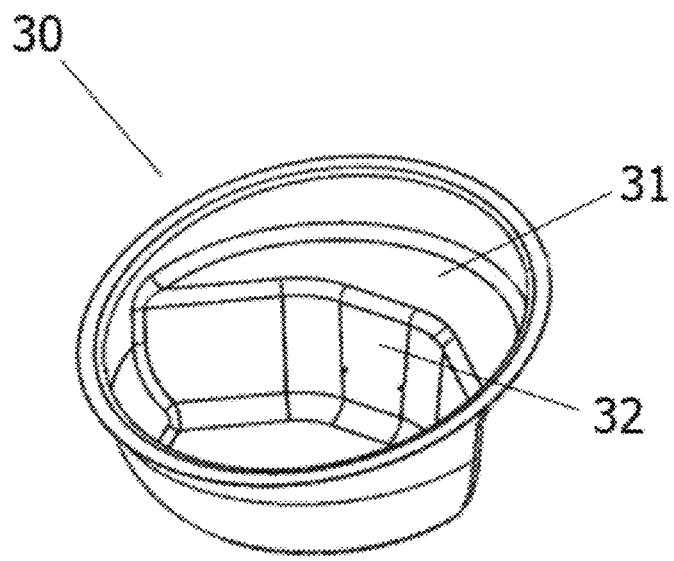
FIG. 3 shows an isometric view of the bowl (30).
Figure 4:
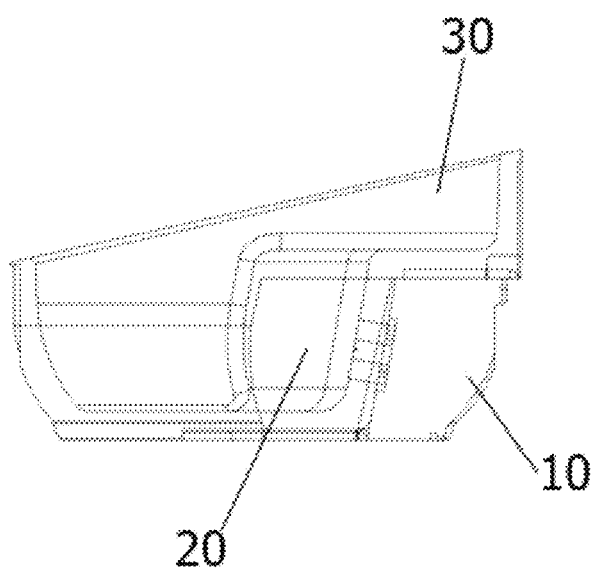
FIG. 4 shows a side view of the assembly of the body (10), base (20) and bowl (30).
Figure 5:
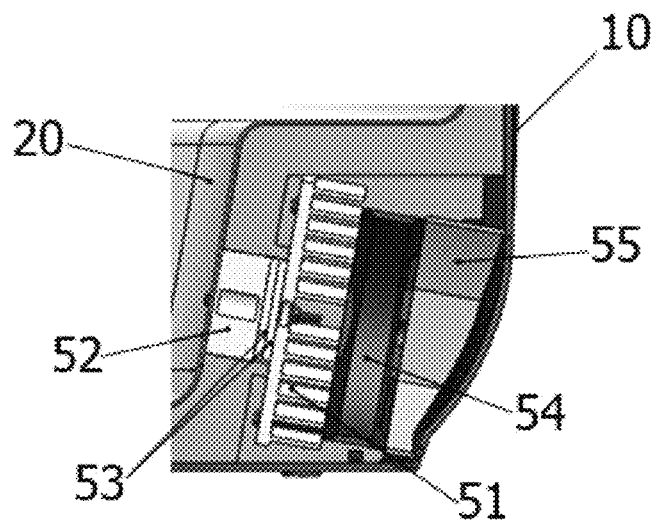
FIG. 5 shows a detail view of the cooling/heating assembly (50).
Figure 6:
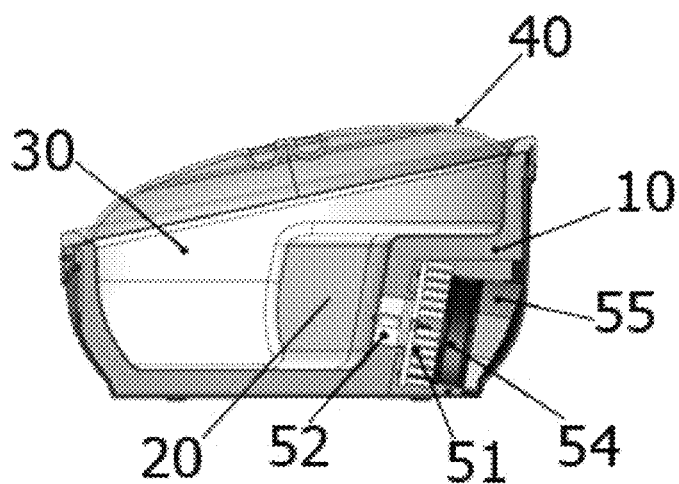
FIG. 6 shows a side view of the device (100) assembly for food conditioning with temperature control.

The food conditioning device (100) with temperature control as disclosed herein comprises a body (10), base (20), bowl (30), cover (40) and a cooling/heating set (50).

Preferably developed with polymeric material, the body (10) has the object to protect all the internal constituents of the device (100), with the form of a rounded container with a hollow inner side, and having an air inlet (11) through the wall on the rear part and at least one air outlet (12) through the wall on the lower portion; it also includes at least three fittings on the upper edge for coupling the collar (14). The body (10) also includes inner fittings to receive at least one electronic board.

The base (20) of the device (100) is responsible for thermal stability, by keeping high or low temperature for longer periods in the container storing the food, thus assuring the energetic efficiency of the food conditioning device (100). It has a half-sphere shape with a flat bottom and a step (21) with approximately half the weight of the wall on its rear portion and measurements allowing for coupling said base (20) within the body (10). Said base (20) also comprises a central passageway (22) on the wall (26) which is lower than the step (21), wherein the cooling/heating assembly (50) is fitted. The base (20) comprises two slots (24) on the bottom, forming air outlets coming from the fan (54) cooling the dissipator (51), and also comprising two flaps (25) closing the whole cooling/heating assembly (50).

The cooling/heating assembly (50) comprises an aluminum block (52), two Peltier boards (53), heat sink (51), ventilator (54) and tunnel (55).

The bowl (30) of the device (100) is responsible for storing the food in the cooled or heated area, inside said food conditioning device (100). It has a half-sphere shape with a flat bottom and a step (21) with approximately half the height of the wall on its rear portion, similar to the base (20), but said bowl (30) has measurements allowing to couple the inner side of said base so to allow for a space between the wall (32) of the step (31) of the bowl (30) and the wall (26) lower than the step (21) of the base (20).

The cover (40) of said food conditioning device (100) is manufactured with translucent material and has the object to keep thermal stability within the food conditioning device (100), also allowing the visibility of food for consumption.

The food conditioning device (100) operates from a microcontroller which receives data from the temperature sensor, continuously reading and sending its values within an infinite loop and, if the read temperature is above 18° C., the microcontroller activates the fan and the Peltier tablets, starting the cooling process inside the fruit container until reaching the temperature of 12° C. When this temperature is reached, the power supply to the Peltier tablets is interrupted, and the fan remains activated for further 30 seconds.

As time goes by, the internal temperature naturally increases until reaching again 18° C., when the cooling process is re-started.

The food conditioning device (100) includes a heating and cooling activation mode. When the heating mode is activated, the temperature sensor continues to read the temperature and the power provided by the supply is inverted, consequently heating inside the device (100). In the heating process, the fan is not activated. The device remains active until the temperature within the device reaches 45° C. after being read by the sensor. The power supply is then interrupted until, naturally after some time, the temperature reaches 43° C., and the process is re-started.

The invention claimed is:

1. A temperature controlled device for holding food equipped with a cooling/heating unit having a Peltier board, comprising:
    a metal block cooled by said Peltier board,
    a heat sink heated by said Peltier board,
    a fan for cooling said heat sink;
    a base that defines a hollow area having a first flat bottom and a first stepped surface, wherein a first wall extends from said first flat bottom to said first stepped surface within said hollow area and wherein said cooling/heating unit is disposed outside of said hollow area under said first stepped surface and a passageway is disposed in said first wall that exposes said hollow area to said cooling/heating unit;
    a bowl sized to rest within said hollow area of said base, said bowl having a second flat bottom and a second stepped surface, wherein when said bowl rests in said hollow area, a space exists between said first flat bottom of said base and said second flat bottom of said bowl that is exposed to said passageway and is temperature controlled by said cooling/heating unit to keep a temperature within one of two ranges, wherein said ranges are between 43° C. and 45° C. and between 12° C. and 18° C.; and
    a cover for said bowl, wherein said cover is translucent.

2. The device according to claim 1, wherein said space extends between said first wall of said base and said second wall of said bowl.

3. The device according to claim 1, further including a body that receives said base, wherein venting slots are provided in between said base and said body that create an air outlet for said fan of said heating/cooling unit.

* * * * *